United States Patent [19]
Nyhart et al.

[11] Patent Number: 5,553,137
[45] Date of Patent: Sep. 3, 1996

[54] METHOD AND APPARATUS FOR ECHO CANCELING IN A COMMUNICATION SYSTEM

[75] Inventors: Scott O. Nyhart, Keller; Tan V. Doan, Fort Worth, both of Tex.

[73] Assignee: Motorola, Inc., Schaumburg, Ill.

[21] Appl. No.: 349,336

[22] Filed: Dec. 5, 1994

[51] Int. Cl.$^6$ ................................................. H04M 9/08
[52] U.S. Cl. ........................ 379/410; 379/406; 379/411; 379/58; 379/402
[58] Field of Search ................................ 379/410, 402, 379/406, 390, 391, 56, 58

[56] References Cited

U.S. PATENT DOCUMENTS

| | | | |
|---|---|---|---|
| 4,843,621 | 6/1989 | Potratz | 379/390 |
| 5,381,475 | 1/1995 | Cavallo | 379/390 |
| 5,398,282 | 3/1995 | Forrester et al. | 379/391 |

OTHER PUBLICATIONS

L3000 SLC Mar. 9, 1993 Data Sheets SGS–Thomson.
PS1913 Feb. 1991 Telecoms IC Handbook, Plessey Semiconductors.

*Primary Examiner*—Jeffery Hofsass
*Assistant Examiner*—Jacques M. Saint-Surin
*Attorney, Agent, or Firm*—John G. Rauch; Barbara R. Doutre

[57] ABSTRACT

A communication system including a base station (102) and a handset (104) provides a reduced level of near end reflections which results in a reduced level of sidetone for both near end and far end users. The base station includes an echo canceler (124) that trains on noise generated by the echo canceler (124) during inter digit dialing.

11 Claims, 3 Drawing Sheets

METHOD AND APPARATUS FOR ECHO CANCELING IN A COMMUNICATION SYSTEM

TECHNICAL FIELD

This invention relates in general to communication systems, and more specifically to a technique for optimizing sidetone.

BACKGROUND

Many telephone systems, particularly cordless telephone systems, are designed to operate in urban environments which have a high level of ambient noise. Conditions of this type make the optimization of sidetone level extremely important. In telephony, sidetone is defined as an attenuated level of one's own voice heard in the telephone handset ear piece. In telephony systems in which there is a delay to the audio path, the sidetone produced by the 4 wire to 2 wire reflection will sound like an echo. This echo can be annoying to the user to the point of disrupting his ability to communicate on the telephone. To overcome this problem, echo cancelers, usually digital signal processors, are used to dynamically reduce the reflected echoes or sidetones. These echo cancelers need a certain amount of time to converge which results in the sidetone being heard for a certain amount of time.

The echo canceler can train on near end audio, white noise, or background noise. Typically the training of the echo canceler begins once communication between a near end and far end user has been established. If audio is used, it results in the near end user initially hearing his sidetone, then gradually hearing the sidetone dissipate. When background noise is used, the low levels of background noise cause the echo canceler to take longer to converge, resulting in an increased chance that the near end user will begin speaking before convergence. This in turn results in the near end user initially hearing his sidetone as the canceler converges. If the noise level is increased to a level higher than the background noise, the far end user may hear the added noise for the duration of the training of the canceler.

Hence, there is a need for an improved method for reducing sidetone in a communication device.

SUMMARY

The present invention therefore provides a method for reducing echo in a communication system. The communication system includes a portable handset and a base station including an echo canceller. The echo canceller generates a noise signal in response to a stored noise coefficient. The method includes the steps of receiving a dial tone, dialing digits, receiving audible reflected digit tones while dialing, and, in response to the audible reflected digit tones, updating the noise coefficient of the echo canceller.

The present invention further provides a method of reducing sidetone during a call in a communication system which includes first and second radios and a base station having an echo canceller. The method includes the step of dialing digits at the first radio, converging the echo canceller during the inter digit dialing time, decoding the dialed digits at the telephone network, routing the call to the second radio, and answering the call at the second radio.

The present invention still further provides a communication system including a base station, a first portable handset including a means for dialing digits to make a call, a second communication device for receiving the call, and an echo canceller located within the base station. In response to noise generated between the dialing of digits, the echo canceller converges on noise to optimize sidetone.

DETAILED DESCRIPTION OF THE PREFERRED EMBODIMENTS

Figure 1:
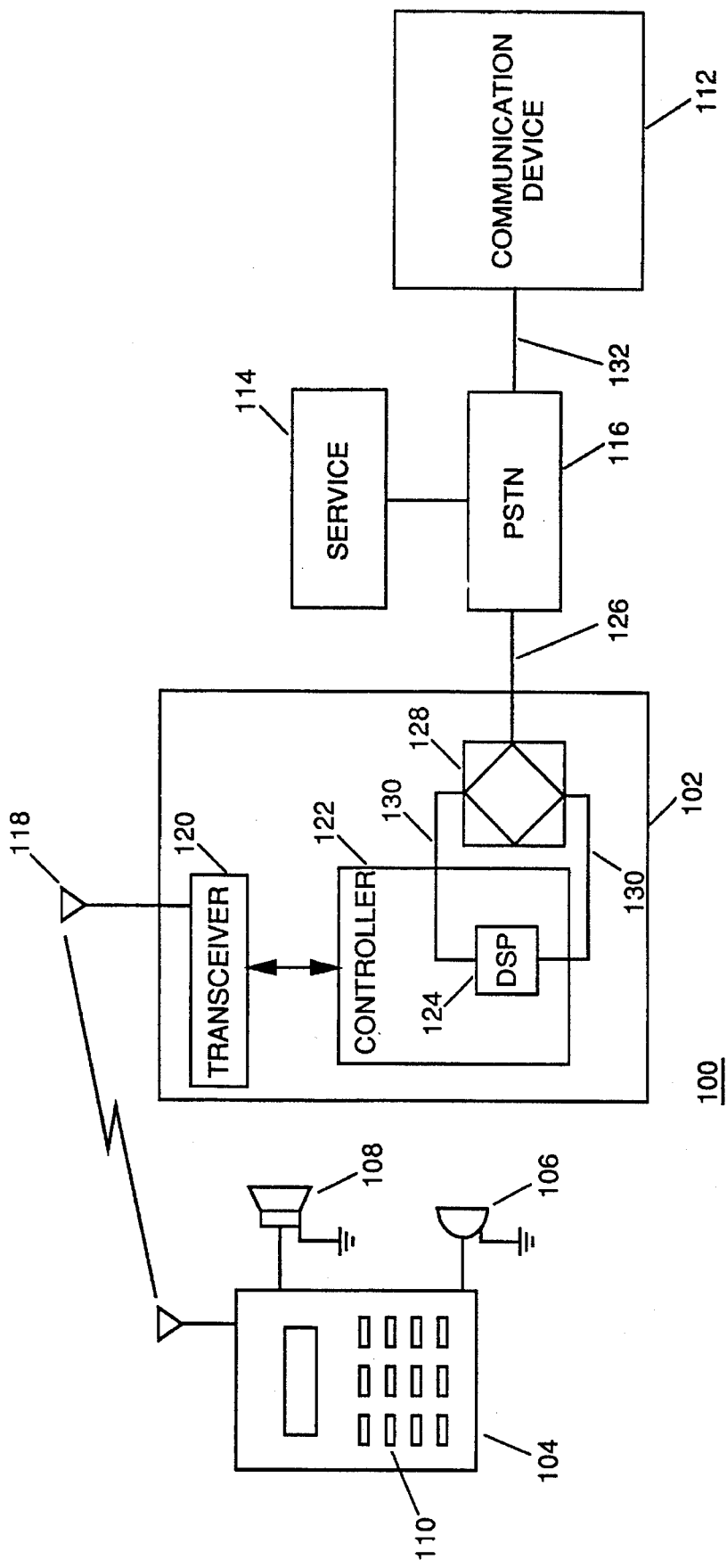
FIG. 1 is a block diagram of a communication system employing the sidetone optimization circuit in accordance with the present invention.

Referring to FIG. 1, there is shown a block diagram of a communication system 100 in accordance with the present invention. The communication system 100 controls a process for reducing the amount of sidetone heard by both near end and far end users.

The communication system 100 includes a base station 102 which utilizes radio channels to communicate with a mobile unit, such as a portable handset 104. The portable handset 104 may be for example, a handset utilized in a DECT (digital European cordless telephone) communication system. Within the handset 104 is a microphone 106, an ear piece 108, and a means for dialing, such as a keypad 110. In the preferred embodiment, the near end user is referred to as the one making the call on portable handset 104 while the far end user is identified as the one receiving the call on communication device 112. The sidetone problem exists for any communication system using the telephone network, therefore, the communication device 112 used by the far end user can be a second base station with cordless phone, a wireline telephone, an answering machine, or some other terminal communication device.

The communication system 100 further comprises a conventional service center 114, which is coupled to the base station 102 by a telephone network, such as the public switched telephone network (PSTN) 116. The service center 114 communicates over the PSTN 116 with the base station 102 and provides automatic number capabilities (AND, a feature which is well known to one of ordinary skill in the art. The base station 102 includes an antenna 118 configured to receive radio frequency (RF) signals. The antenna 118 is coupled to RF transceiver 120 which encodes and decodes the communicated RF signals in a manner well known to one of ordinary skill in the art. The base station 102 further includes a controller section 122 including a central processing unit (CPU—not shown) for controlling the operation of the base station. The controller section 122 also includes a digital signal processor (DSP) 124 to provide adaptive echo canceling by removing transmitted speech from the receive path. Memory, such as random access memory (RAM), for temporarily storing variables during operation of the base station and a second memory, such as read only memory (ROM), for storing subroutines executed by the CPU during operation of the base station 102, are also included (but not shown) in the controller section 122.

A standard two wire phone line 126 couples the base station 102 to the PSTN 116. The base station 102 uses a standard hybrid 128 to convert from two wire 126 to four wire 130 and couples the four wire signal to the DSP 124. Similarly the communication device 112 is also coupled to the PSTN 116 through a standard two wire connection 132. Communication device 112 internally converts from two wire to four wire using standard conversion techniques. In communication system 100, the near end reflection is the signal reflected between the handset 104 and the PSTN 116 while the far end reflection is the signal reflected between the near end user at portable handset 104 and the far end user at communication device 112. By using the DSP 124 in the manner to be described, a reduction in near end reflection is achieved thus reducing the level of sidetone heard by both the near end and far end users.

In the preferred embodiment, the DSP 124, operating under the control of controller section 122, generates low level white noise in a pseudo random (PN) sequence onto the two wire phone line 126 during the inter digit dialing time. The DSP 124 then compares the echo transmitted back with that of the original noise level. The result is a residual echo level which is stored as an echo canceler noise coefficient. This noise coefficient is preferably stored in the RAM portion of controller section 122, with a new noise coefficient being produced between every dialed digit. The echo canceler noise coefficient characterizes the echo for loudness, pitch, and tone. The handset 104 is muted during the inter digit dialing time while the noise generated by the echo canceler is injected onto the phone line. This prevents the near end user from hearing the characterization being done. The echo canceler 124 is thus trained during the inter digit dialing time before two way communication between the near end and far end users is established.

Figure 2:
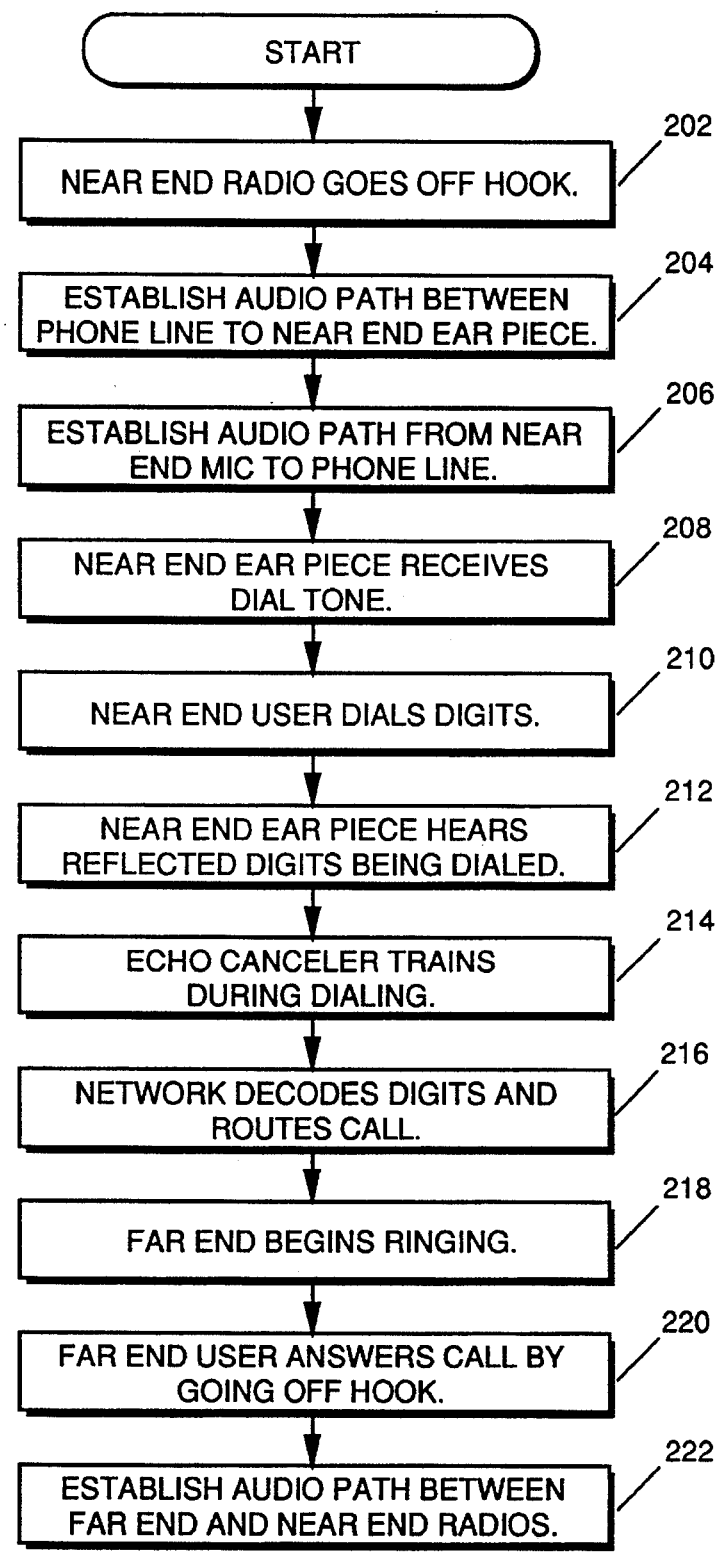
FIG. 2 is a flow chart of the call connection in accordance with the present invention.

Referring now to FIG. 2 there is shown a flow chart 200 in accordance with the present invention. In step 202, the near end radio goes off hook. The audio path between the phone line to the near end ear piece is then established at step 204. In step 206, the audio path from the near end microphone to the phone line is established. The near end ear piece receives a dial tone in step 208, and the near end user dials digits either individually or "enbloc" (i.e. by redial memory) in step 210. The near end ear piece hears the reflected dialed digits at step 212 and the echo canceler trains during the dialing sequence at step 214. The telephone network decodes the digits and routes the call in step 216, and the far end begins ringing at step 218. The far end user answers the incoming call by going off hook at step 220, and the audio path between the far end and near end communication devices is established in step 222. This provides a method of training the echo canceler before communication is established between the two communication devices.

Figure 3:
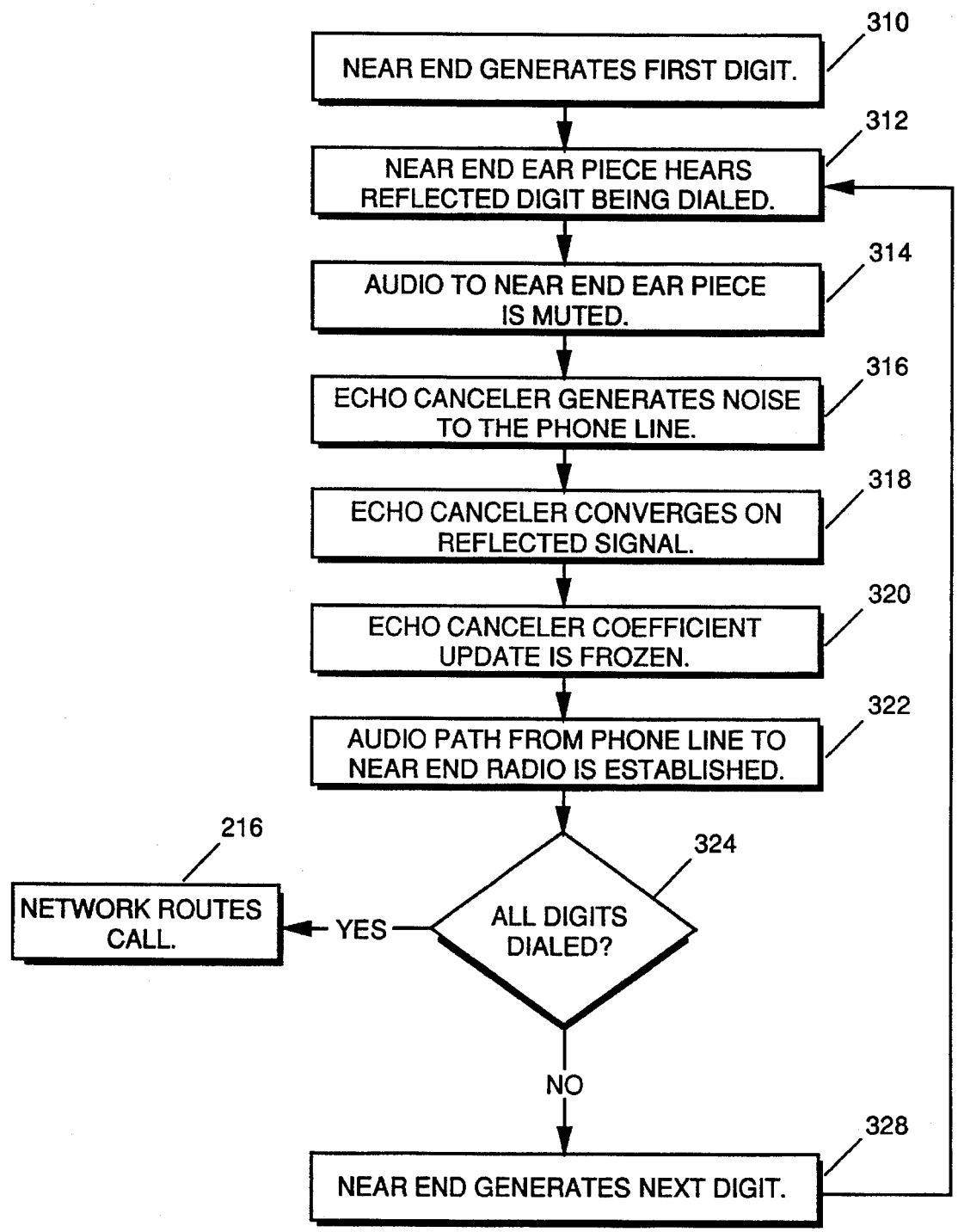
FIG. 3 is a flow chart of the training technique in accordance with the present invention.

Referring now to FIG. 3 there is shown a flowchart 300 representing the preferred embodiment describing the training (or convergence) technique used during the dialing sequence in steps of 210 through 216 of flow chart 200 in more detail. As the user dials in the first digit at step 310 the near end ear piece hears the reflected digit being dialed at step 312. The audio to the near end ear piece is then muted in step 314. Once the audio to the ear piece is muted the echo canceler generates noise, preferably low level white noise, onto the phone line at step 316. The echo canceler converges on the reflected noise signal in step 318. The echo canceler noise coefficient update is then frozen (i.e. maintained) at step 320 while the digit is being dialed. The audio path from the phone line to the near end radio is then established in step 322. At step 324 if all the digits have been dialed the network proceeds to route the call at step 326 (step 216 of previous flowchart). Otherwise, the near end generates the next digit at step 328 and the routine is returned to step 312 until all digits are dialed. By training the echo canceler and allowing it to converge only during the inter digit dialing time both the near end and far end are submitted to a reduced level of sidetone once communication is established.

As an example, in the United States, the inter digit time in the telephone system is speced at greater than 40 milliseconds (ms) for communication devices dialing "enbloc". If the individual user is dialing real-time, the inter-digit dialing is longer. Therefore, the echo canceler still has 160 ms for convergence using the technique as described by the invention. Using the inter-digit dialing time to allow the echo canceler to converge provides at least 160 ms or greater of echo canceler convergence time before the full two way communication path is opened. For example, when using a full ten digit number in the U.S., the echo canceler has 400 ms for convergence. Real-time dialing typically provides an even longer time to allow for convergence.

By using the inter digit dialing time to allow the echo canceler to converge, a reduction in the amount of sidetone heard by the user is achieved before full two way communication is opened. The method and apparatus as described by the invention is readily applicable to communication systems, such as DECT, where an echo canceler must be included due to long delay times in the audio paths. Furthermore, the technique as described by the invention can be implemented in any personal communication system that incorporates adaptive echo cancellation for muting the near end reflection.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for reducing echo in a communication system, the communication system including a portable handset and a base station, the base station including an echo canceller, the echo canceller generating a noise signal in response to a noise coefficient, wherein said base station is configured to be coupled to a telephone network line, the method comprising the steps of:

receiving a dial tone at the portable handset;

dialing digits into the portable handset;

receiving audible reflected digit tones during the step of dialing; and in response to the audible reflected digit tones, updating the noise coefficient of the echo canceller between the dialing of the digits.

2. A method as described in claim 1, wherein the step of updating the noise coefficient of the echo canceller includes the steps of:

muting the portable handset between receipt of each of the audible reflected digit tones;

generating the noise signal in response to the audible reflected digit tones;

providing the noise signal from the echo canceller onto the telephone network line;

reflecting the noise signal from the telephone network line back to the echo canceller; and converging the echo canceller on the reflected noise signal.

3. A method as described in claim 2, further including the step of maintaining the noise coefficient during the step of dialing.

4. A method as described in claim 1, further including the step of maintaining the noise coefficient during the step of dialing.

5. A method as described in claim 1, further comprising the steps of:

decoding the dialed digits;

routing the call to a second communication device using the updated noise coefficient; and answering the call at the second communication device.

6. A method of reducing sidetone during a call in a communication system, the communication system including first and second radios, a base station including an echo canceller, the communication system configured to be coupled to a telephone network, the method comprising the steps of:

dialing digits at the first radio with a predetermined inter digit dialing time between each dialed digit;

converging the echo canceller during the inter digit dialing time;

decoding the dialed digits at the telephone network;

routing the call to the second radio; and answering the call at the second radio.

7. A method as described in claim 6 wherein the step of converging further includes the steps of:

muting the first radio during the inter digit dialing time; and generating white noise from the echo canceler during the inter digit dialing time.

8. A communication system, comprising:

a base station configured to be coupled to a telephone network, the telephone network having telephone lines;

a first portable handset for establishing a communication link with the base station, the first portable handset including a means for dialing digits in order to make a call;

a second communication device for receiving the call from the first portable handset; and an echo canceller located within the base station, the echo canceller responsive to noise generated between the dialing of digits and the echo canceller converging on said noise to optimize sidetone.

9. A communication system as described in claim 8, wherein the portable handset is muted between the dialing of digits and the echo canceler generates said noise.

10. A communication system as described in claim 9, wherein the echo canceler provides a noise coefficient based on the noise generated between the dialing of digits, said noise coefficient being updated between the dialing of digits.

11. A method as described in claim 7 wherein the step of converging the echo canceller comprises the steps of:

receiving at the first radio audible reflected digit tones during the inter digit dialing time; and in response to the audible reflected digit tones, storing a noise coefficient at the first radio;

wherein the white noise is generated in response to the noise coefficient.

* * * * *